(12) United States Patent
Gower et al.

(10) Patent No.: US 11,267,999 B2
(45) Date of Patent: Mar. 8, 2022

(54) ACRYLIC EMULSION ADHESIVES

(71) Applicant: Avery Dennison Corporation, Glendale, CA (US)

(72) Inventors: Mark D. Gower, Lock Haven, PA (US); Eric L. Bartholomew, Mill Hall, PA (US); Qiang Luo, State College, PA (US); Charles R. Williams, Jr., Lock Haven, PA (US)

(73) Assignee: Avery Dennison Corporation, Glendale, CA (US)

( * ) Notice: Subject to any disclaimer, the term of this patent is extended or adjusted under 35 U.S.C. 154(b) by 313 days.

(21) Appl. No.: 16/263,228

(22) Filed: Jan. 31, 2019

(65) Prior Publication Data
US 2019/0161655 A1    May 30, 2019

Related U.S. Application Data

(62) Division of application No. 15/144,050, filed on May 2, 2016, now Pat. No. 10,287,464.

(60) Provisional application No. 62/155,508, filed on May 1, 2015.

(51) Int. Cl.
| | | |
|---|---|---|
| *C08F 220/18* | (2006.01) | |
| *C08F 293/00* | (2006.01) | |
| *C08F 2/38* | (2006.01) | |
| *C09J 153/00* | (2006.01) | |

(52) U.S. Cl.
CPC .......... *C09J 153/005* (2013.01); *C08F 2/38* (2013.01); *C08F 220/18* (2013.01); *C08F 293/00* (2013.01); *C08F 293/005* (2013.01); *C09J 153/00* (2013.01); *C08F 2438/03* (2013.01)

(58) Field of Classification Search
CPC .. C08F 220/18; C08F 293/00; C08F 293/005; C08F 2438/03; C08F 2/38; C09J 153/00
USPC ......................................................... 524/560
See application file for complete search history.

(56) References Cited

U.S. PATENT DOCUMENTS

| | | | |
|---|---|---|---|
| 9,540,458 B2 * | 1/2017 | Prenzel | C08F 2/38 |
| 2008/0280518 A1 | 11/2008 | Takahashi et al. | |
| 2009/0253850 A1 | 10/2009 | Yagura et al. | |
| 2011/0118372 A1 | 5/2011 | Lester et al. | |
| 2013/0059971 A1 | 3/2013 | Miller et al. | |
| 2014/0284053 A1 | 9/2014 | Germack | |
| 2016/0297682 A1 | 10/2016 | Anderson et al. | |

FOREIGN PATENT DOCUMENTS

| | | | |
|---|---|---|---|
| CN | 104220470 | 12/2014 | |
| CN | 104220470 A * | 12/2014 | ............. B05D 3/108 |
| EP | 3012303 | 12/2016 | |

(Continued)

OTHER PUBLICATIONS

De Rosa et al., "The effect of entanglements on the rheological behavior of polybutadiene critical gels," Rheologica Acta, vol. 33, pp. 200-237, 1994.

(Continued)

*Primary Examiner* — Kelechi C Egwim

(57) ABSTRACT

Methods of forming acrylate polymers using emulsion polymerization techniques are described. The resulting acrylate polymers exhibit characteristics enabling their use in adhesives and replacing acrylic polymers formed by solvent-based polymerization methods. Various polymers and adhesives utilizing such polymers are also described.

29 Claims, 9 Drawing Sheets

(56) References Cited

FOREIGN PATENT DOCUMENTS

| | | |
|---|---|---|
| JP | 2008-280439 | 11/2008 |
| JP | 2009-249497 | 10/2009 |
| JP | 2009-269956 | 11/2009 |
| JP | 2010-084106 | 4/2010 |
| WO | 93/18072 | 9/1993 |
| WO | 2008/122576 | 10/2008 |
| WO | 2009/117654 | 9/2009 |
| WO | 2010/000725 | 1/2010 |
| WO | 2013/055978 | 4/2013 |
| WO | 2013/113930 | 8/2013 |
| WO | 2014/204212 | 12/2014 |

OTHER PUBLICATIONS

Zhang et al., "Surface enrichment by conventional and polymerizable sulfated nonylphenol ethoxylate emulsifiers in water-based pressure sensitive adhesive," Industrial and Engineering Chemistry Research, vol. 52, pp. 8616-8621, 2013.

He et al., "Application of ammonium a-allyl alkyl phenol polyoxyethylene ether sulfonate in acrylic emulsion pressure sensitive adhesive," Polymer-Plastics Technology and Engineering, vol. 50, pp. 1570-1575, 2011.

International Search Report and Written Opinion dated Jul. 25, 2016 issued in corresponding IA No. PCT/US2016/030379 filed May 2, 2016.

International Preliminary Report on Patentability dated Nov. 16, 2017 issued in corresponding IA No. PCT/US2016/030379 filed May 2, 2016.

Tersuo Ogawa, Study of Emulsion Polymerization Based on Addition-fragmentation Chain Transfer Reaction, Research on Coatings, 2001, No. 137, pp. 11-17.

\* cited by examiner

ACRYLIC EMULSION ADHESIVES

CROSS-REFERENCE TO RELATED APPLICATION

The present application is division of U.S. patent application Ser. No. 15/144,050 filed May 2, 2016, which claims the benefit of U.S. Provisional Application No. 62/155,508 filed May 1, 2015, both of which are incorporated herein by reference in their entireties.

FIELD

The present subject matter relates to acrylic based pressure sensitive adhesives prepared from emulsions which exhibit performance characteristics comparable to solvent-based pressure sensitive adhesives.

BACKGROUND

Acrylic adhesives provide a wide range of performance benefits. Such adhesives include acrylic polymers that are formed using solvent and solventless polymerization techniques. Although satisfactory in many respects, artisans have attempted to utilize acrylic polymers formed by emulsion polymerization, in adhesives. Emulsion polymerization offers several advantages including ability to form high molecular weight polymers at fast polymerization rates; the water phase present in emulsion polymerization is an excellent conductor of heat, and the viscosity of the reaction medium remains relatively stable and approximately that of water.

However, a number of challenges exist in attempting to incorporate polymers formed via emulsion techniques in adhesives, and particularly in high performance adhesives. These challenges include preparing a coherent adhesive film despite the particle nature of emulsion adhesives, preparing an adhesive polymer film with a defined molecular structure including regular polymer lengths between crosslink points, providing a controlled number of entanglements between precursor or pre-crosslinked polymer chains, and preventing surfactant migration to adhesive film interfaces where such surfactant can dramatically reduce adhesion performance.

Accordingly, a need exists for emulsion-based polymers that can be effectively used in adhesive formulations.

SUMMARY

The difficulties and drawbacks associated with previous approaches are addressed in the present subject matter as follows.

In one aspect, the present subject matter provides an emulsion-based method of forming acrylate polymers (also referred to as precursor polymers). It should be noted that the method disclosed herein is applicable not only to the preparation of RAFT acrylate oligomers but also to the preparation of controlled architecture acrylate (CAA) oligomers using other controlled radical polymerization agents (CRP agents)/processes, e.g. stable free radical mediated polymerization (SFRP), atomic transfer radical polymerization (ATRP), etc. The method comprises preparing a controlled architecture acrylate (CAA) oligomer, utilizing a CRP chain transfer agent such as a RAFT agent. The method also comprises isolating the CAA oligomer. The method additionally comprises preparing a monomer phase including (i) one or more acrylate monomers, (ii) the isolated CAA oligomer, and (iii) one or more acrylate co-stabilizers. The method also comprises emulsifying the monomer phase using one or more copolymerizable surfactants to form a mini-emulsion. The method further comprises preparing a seed latex from the mini-emulsion. And, the method also comprises growing the seed latex using emulsion polymerization to thereby form acrylate polymers.

In another aspect, the present subject matter provides various acrylate polymers formed by the noted methods.

In still another aspect, the present subject matter provides CAA polymers comprising one or more copolymerizable surfactants. Upon incorporation of the polymers in an emulsion adhesive, the emulsion adhesive exhibits increased adhesion as compared to an emulsion adhesive including corresponding acrylate polymers prepared by a technique other than those used to develop CAA polymers and free of the one or more copolymerizable surfactants.

In yet another aspect, the present subject matter provides acrylic emulsion adhesives including CAA polymers. The polymers include one or more copolymerizable surfactants. The emulsion adhesives exhibit increased adhesion as compared to an emulsion adhesive including corresponding acrylate polymers prepared by a technique other than those used to develop CAA polymers and free of the one or more copolymerizable surfactants.

In yet another aspect, the present subject matter provides acrylic emulsion adhesives including CAA polymers, one or more copolymerizable surfactants and including one or more tackifiers. The emulsion adhesives exhibit high adhesion, increased static shear and low delta opacity as compared to an emulsion adhesive including corresponding acrylate polymers containing tackifier and prepared by a technique other than those used to develop CAA polymers and free of the one or more copolymerizable surfactants.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
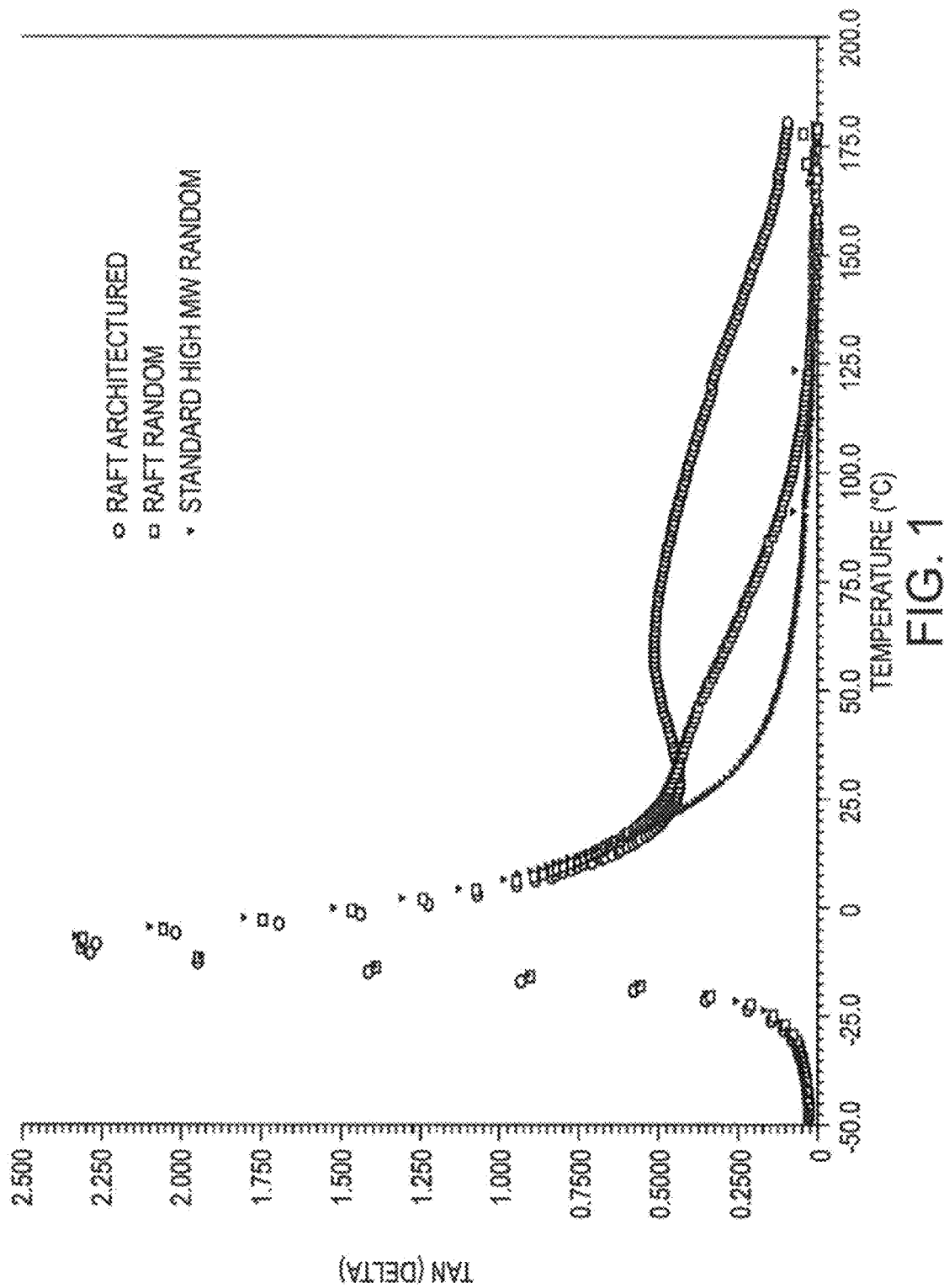
FIG. 1 is a graph of rheological responses of several polymers illustrating benefits of polymers prepared by controlled architecture polymerization methodologies that utilize CRP agents such as RAFT.

The present subject matter provides acrylic emulsion adhesives which exhibit performance characteristics that are comparable, and in certain embodiments are superior, to solvent-based acrylic adhesives. The present subject matter also provides emulsion-based methods of preparing the acrylic adhesives.

The present subject matter also provides various controlled architecture acrylate polymers comprising one or more copolymerizable surfactants. Upon incorporation of the polymers in an emulsion adhesive, the emulsion adhesive exhibits increased adhesion as compared to an emulsion-based adhesive (or "emulsion adhesive" as referred to herein) including corresponding acrylate polymers prepared by a technique other than controlled architecture polymerization and free of the one or more copolymerizable surfactants.

The present subject matter also provides various acrylic emulsion adhesives including controlled architecture acrylate polymers. The polymers include one or more copolymerizable surfactants. The emulsion adhesives exhibit increased adhesion as compared to emulsion-based adhesive including corresponding acrylate polymers prepared by a technique other than controlled architecture polymerization and free of the one or more copolymerizable surfactants.

In accordance with the present subject matter, emulsion pressure sensitive adhesives (PSAs) are prepared via controlled architecture polymerization, such as RAFT mediated controlled radical polymerization, and using reactive surfactant(s) to provide greatly enhanced adhesion performance. Specifically, the enhanced adhesion performance is demonstrated as significantly higher peel adhesion without sacrificing static shear, as compared with (i) similar polymers made using controlled architecture polymerization and conventional, non-reactive surfactants, (ii) similar polymers made using non-RAFT mediated/non-controlled polymerization using reactive surfactants, and/or (iii) similar polymers made using non-RAFT mediated/non-controlled polymerization and conventional, non-reactive surfactants.

The controlled architecture polymerization, such as RAFT mediated controlled radical polymerization process, utilized in accordance with the present subject matter can deliver emulsion acrylate polymers with tightly controlled molecular weight ($M_w$) distribution and with functionality confined to polymer ends and/or functionality distributed across the polymer chain.

A wide array of functional groups can be incorporated in the acrylate polymers, and typically as end segments. Representative examples include, without limitation, (meth) acrylate, hydroxy, siloxy, epoxy, cyano, isocyanate, amino, aryloxy, aryalkoxy, oxime, (meth)acryloxy, aceto, and reactive silanes such as alkoxy silanes, e.g., tetramethoxysilane, epoxyether and vinyl ether, alkoxymethylol, cyclic ethers, thiols, benzophenone, acetophenone, acyl phosphine, thioxanthone, and derivatives of benzophenone, acetophenone, acyl phosphine, and thioxanthone. In one embodiment, these groups may be added to one of more of the terminal ends of the polymer(s) via reaction with compounds containing these functionalities.

Upon cross linking, such as using an acid functional polymer with a trifunctional amine for example, a regular polymer network is formed.

Improved mechanical properties delivered by mediated controlled radical polymerization are realized as high peel adhesion when the adhesive layer is able to directly contact the substrate. If non-reactive/non-polymerizable surfactants are used to manufacture the emulsion PSA, they tend to quickly migrate to polymer interfaces. Non-reactive surfactants when present at surfaces form weak boundary layers that prevent opportunity for increased wetting and subsequent high peel adhesion performance. Reactive surfactants, when chemically bound within the adhesive polymer chain are not free to migrate to interfaces and therefore tend not to reduce peel adhesion performance. Additional details and aspects of the present subject matter are as follows.

The Polymers

Referring to FIG. 1, various polymer samples of butyl acrylate and t-butyl acrylate (BA/tBA) copolymers were formed with eight methacrylic acid (MAA) moieties per chain, each with varying architecture. The curve designated as "RAFT ARCHITECTURED" shows a rheological response of a solvent polymer that is observed when Reversible Addition-Fragmentation chain Transfer (RAFT) is used to control molecular weight and place reactive groups on the polymer chain ends during polymer synthesis. This is typical of the response that is observed in many RAFT emulsion polymers of the present subject matter. The term "RAFT polymer" (or like term) as used herein refers to a polymer formed using RAFT techniques or other controlled radical polymerization methodologies such as SFRP, ATRP, etc.

The curve designated as "RAFT RANDOM" is the tan delta response for polymers prepared by RAFT without structured chain formation. Overall, the tan delta response, i.e., the ratio of the viscous response to the elastic response, is much higher for the RAFT architectured polymer. It is the higher ratio of viscous to elastic response, particularly at higher temperatures, that delivers higher peel force outcomes for these adhesives. The higher tan delta at the higher temperatures enables polymers to form better contact with adhered surfaces (also known as better wetting). In rheology, high temperature responses can be replicated by using slow deformation rates. Surface wetting is a slow rate process as polymers relax and flow to make intimate contact with surfaces.

The curve designated as "STANDARD HIGH MW RANDOM" is the tan delta response for a conventionally prepared adhesive with randomly placed reactive groups. The low tan delta for that adhesive at high temperatures indicates it will also have a low tan delta at low deformation rates. This adhesive will not wet the adhered surface well, and thus will not establish intimate contact with the surface.

If an adhesive does not provide good surface wetting, when the adhesive is de-bonded, usually at much higher deformation rates compared with the bonding rates, the surfaces, i.e., adhesive and adherend, will be separated relatively easily. Without establishing a good interfacial bond, deforming an adhesive during debonding will not realize the dissipative capacity of the adhesive, thus returning a low debonding peel force.

Therefore, more than just a highly dissipative adhesive is needed to achieve good adhesion properties. The adhesive must have cohesive strength. That is, the adhesive must have some internal strength to resist being pulled apart.

This characteristic can be approximately measured using a static shear test. For this test an adhesive tape is applied to a test panel with a loop on one end to hang a weight. The panel is supported vertically and when the weight is suspended, the suspended weight creates a vertical shearing force on the adhesive layer. A timer is used to measure the time period for the weight to pull the adhesive off the test panel. The longer the adhesive resists failure, the higher is its shear performance.

High shear is typically provided by a high molecular weight and/or a high degree of cross-linking. Rheology tests reveal that the adhesives, in accordance with the present subject matter, have a relatively high modulus, particularly at higher temperatures, thus a relatively high modulus corresponding to lower rates of deformation (by the Time-Temperature-Superposition principle).

FIG. 1 does not illustrate another characteristic of adhesives because the figure does not show the comparative moduli.

Figure 2:
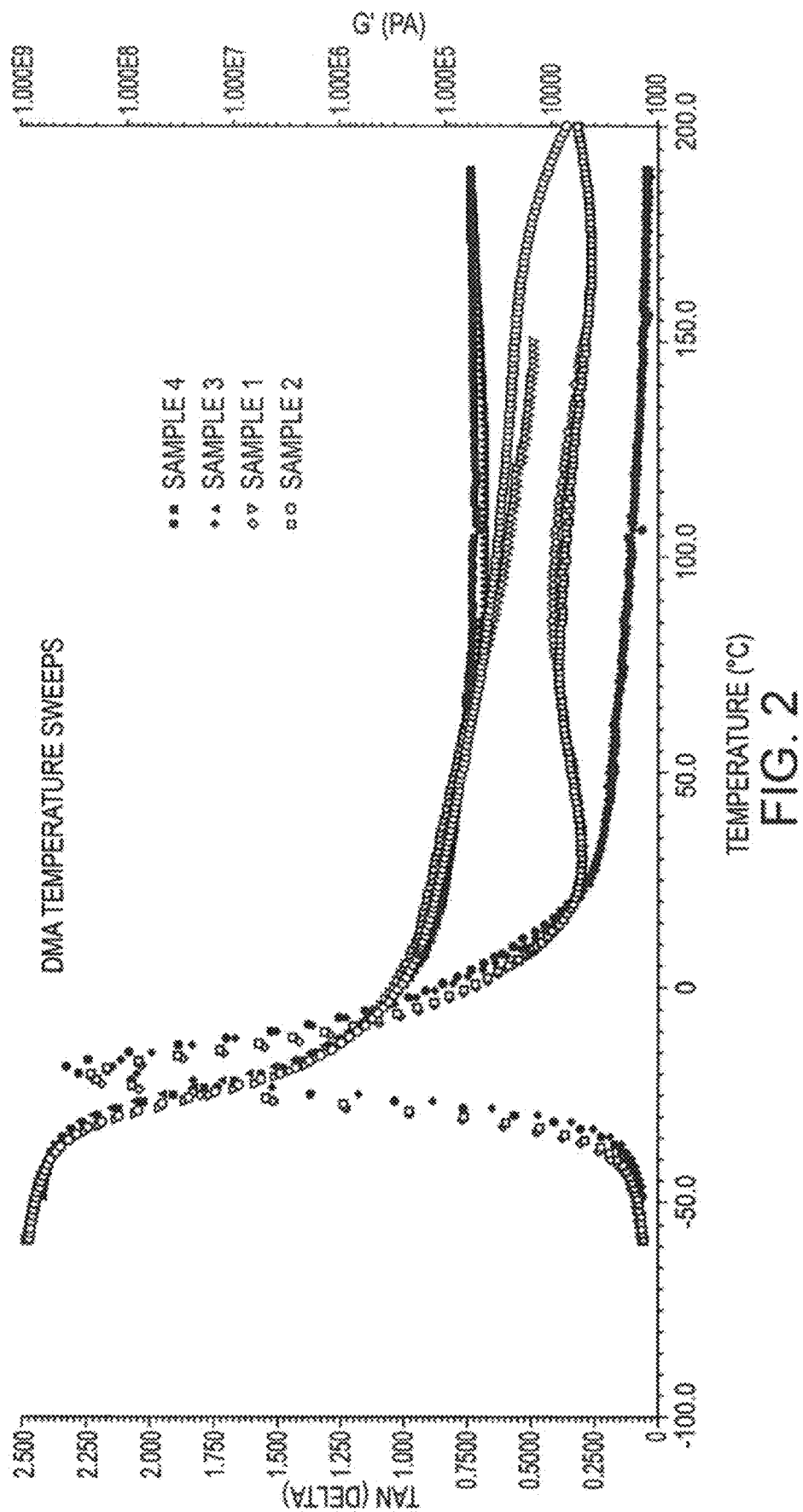
FIG. 2 is a graph of rheological responses of RAFT prepared polymers in accordance with the present subject matter compared to conventional RAFT polymers.

FIG. 2 is a chart comparing RAFT emulsions in accordance with the present subject matter with those of similar composition made without RAFT control. The curves for Samples 1 and 2 show the tan delta and modulus as a function of temperature for two particular RAFT polymers in accordance with the present subject matter. The curves for Samples 3 and 4 are the conventionally prepared polymers.

It is evident that RAFT polymers offer much higher tan delta at higher temperatures, i.e., above 25° C.

Just as importantly, the modulus of the RAFT polymers is not detrimentally affected. An insignificant amount of modulus is given up in these examples to achieve much higher peel force. The present subject matter adhesives retain high shear but enable much higher peel.

Figure 3:
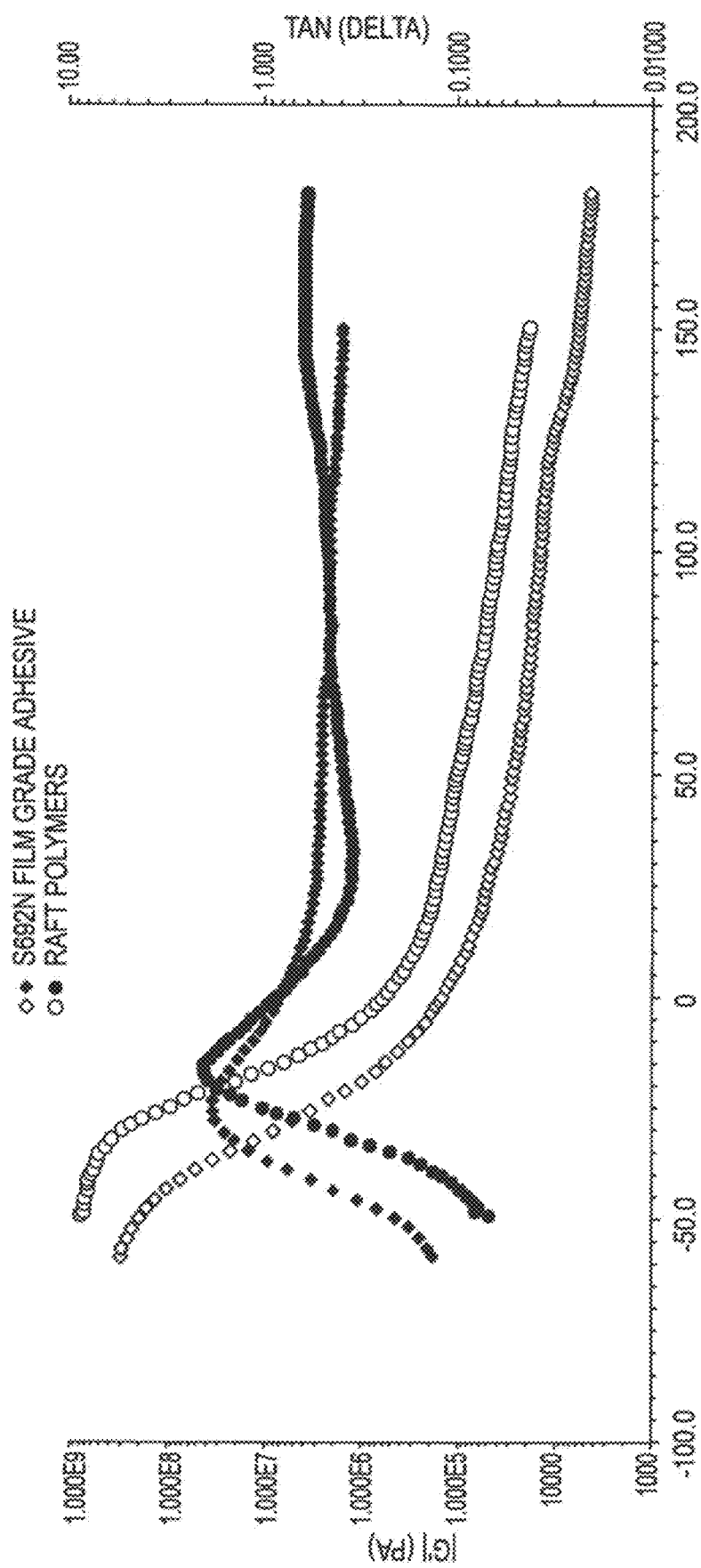
FIG. 3 is a graph comparing the rheological response of polymers of the present subject matter to a conventionally prepared commercially available polymer.

In many applications, formulated adhesives such as a film grade adhesive S692N available from Avery Dennison, has a higher tan delta but a lower modulus. The present subject matter controlled architecture acrylate polymers provide improved peel and with much improved static shear via the higher modulus, as is evident in the comparison, shown in FIG. 3.

In certain embodiments, polymers formed in accordance with the present subject matter methods have number average molecular weights (Mn) within a range of from about 500,000 to about 100,000 g/mol, in particular embodiments from about 250,000 to about 110,000 g/mol, and in still other embodiments from about 200,000 to about 125,000 g/mol. In certain specific embodiments, the polymers of the present subject matter have a molecular weight within a range of from about 170,000 to about 130,000 g/mol. However, it will be appreciated that the present subject matter polymers may have molecular weights greater than about 500,000 and/or less than about 100,000 g/mol. Typically, the polymers formed in accordance with the present subject matter methods have a polydispersity (PDI) of less than about 4.0, in certain embodiments less than 3.0, in still other embodiments less than 2.5, and in certain versions less than 2.0. Generally, the polydispersity is greater than about 1.15.

Representative and non-limiting examples of ranges of glass transition temperatures (Tg) for the controlled architecture acrylate (CAA) polymers and/or adhesives of the present subject matter are from about 10° C. to about −115° C., in other embodiments from about 0° C. to about −80° C., and in certain embodiments from about −10° C. to about −40° C., and in still other embodiments from about −10° C. to about −30° C.

In one embodiment of the present subject matter there is provided a polymer emulsion composition comprising: at least one acrylic copolymer including a surfactant copolymerized with the acrylic block copolymer, the surfactant being chemically bound to the polymer chain, the acrylic copolymer including at least one first segment of controlled size and position and at least one second segment of controlled size and position. The first segment including a monomer having a functional group selected from the group consisting of a self reactive functional group, a reactive functional group, and combinations thereof. In some embodiments, the second segment does not contain a crosslinkable functional group, wherein the second segment is non-reactive with the functional group of the first segment. In other embodiments, the second segment may contain a functional group that is capable of undergoing crosslinking while remaining nonreactive with the functional groups of the first segment. The functional groups of the first segment are capable of undergoing crosslinking reactions while remaining reactive with each other, and whereby the functional groups are in a non-terminal position in the copolymer. In embodiments wherein the second segment contains a crosslinkable functional group or wherein the second segment does not contain a crosslinkable functional group, the first segment and the second segment are molecularly miscible before cure. In some embodiments, the polymer emulsion composition described herein is a liquid polymer at room temperature. In other embodiments, the polymer emulsion composition described herein is a single phase polymer at room temperature. In certain other embodiments, the polymer emulsion composition described herein is a single phase liquid polymer at room temperature.

The second (non-reactive) segment of the acrylic polymer may be derived from acrylates, methacrylates, or mixtures thereof. The acrylates include $C_1$ to about $C_{20}$ alkyl, aryl or cyclic acrylates such as methyl acrylate, ethyl acrylate, phenyl acrylate, butyl acrylate, 2-ethylhexyl acrylate, n-hexyl acrylate, n-heptyl acrylate, n-octyl acrylate, n-nonyl acrylate, isobornyl acrylate, 2-propyl heptyl acrylate, isodecyl acrylate, isostearyl acrylate and the like. These compounds typically contain from about 3 to about 20 carbon atoms, and in one embodiment about 3 to about 8 carbon atoms. The methacrylates include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, isooctyl methacrylate, and the like. These compounds typically contain from about 4 to about 20 carbon atoms, and in one embodiment about 3 to about 10 carbon atoms.

The first segment of the acrylic polymer may be a copolymer derived from one or more of the monomers of the second (non-reactive) segment and at least one polymerizable comonomer having crosslinkable functionality. In one embodiment, the reactive segment comprises at least one monomer having the formula:

(I)

where R is H or $CH_3$ and X represents or contains a functional group capable of crosslinking. The crosslinkable functional group of the first segment of the acrylic polymer is not particularly restricted, but may include one or more crosslinkable silyl, hydroxyl, carboxyl, carbonyl, carbonate ester, isocyanato, epoxy, vinyl, amino, amide, imide, anhydride, mercapto, acid, acrylamide, acetoacetyl groups, alkoxymethylol, and cyclic ether groups.

In another embodiment, the present subject matter provides a polymer emulsion composition comprising: at least one acrylic copolymer including a surfactant copolymerized with the acrylic block copolymer, the surfactant being chemically bound to the polymer chain, the acrylic copolymer including at least one first segment of controlled size and position and at least one second segment of controlled size and position that includes at least one monomer having a reactive functional group. The first segment including a monomer having a functional group selected from the group consisting of a self reactive functional group, a reactive functional group, and combinations thereof and whereby the first segment and the second segment are molecularly miscible before cure. The reactive functionalities in the first segment and the second segment may be the same or different from one another. A wide array of reactive functionalities can be included in the first and second segments. In certain embodiments, the reactive functional group of the second segment is a self reactive functional group as in the first segment. The self reactive functional group in the second segment may be the same or different than the self reactive functional group of the first segment. In other embodiments, the second segment may contain a functional group that is capable of undergoing crosslinking while remaining reactive with itself or with another second segment of a different polymer. And, in certain embodiments, the second segment is free of a self reactive functional group. In some embodiments, the polymer emulsion composition described herein is a liquid polymer at room temperature. In other embodiments, the polymer emulsion composition described herein is a single phase polymer at room temperature. In certain other embodiments, the polymer emulsion composition described herein is a single phase liquid polymer at room temperature.

In still another embodiment contemplated herein, the first segment and the second segment are molecularly immiscible before cure. In some embodiments, the polymer emulsion composition described herein is a phase separated polymer at room temperature. In certain other embodiments, the polymer emulsion composition described herein is a phase separate liquid polymer at room temperature. As used herein, room temperature is about 15° to about 25° C.

The term "reactive functional group" refers to a functional group that is capable of reacting with another functional group. The term "self reactive functional group" refers to a functional group that is capable of reacting with (i) an identical second self reactive functional group, (ii) with a different second self reactive functional group and/or (iii) with a reactive functional group. That is, the self reactive functional group may react with another identical self reactive functional group, with another self reactive functional group that is different, and/or with a reactive functional group. Self reactive functional groups are capable of polymerizing with themselves. The self reactive functional group may be selected from anhydrides, epoxies, alkoxymethylols, and cyclic ethers. Non-limiting examples of reactive functional groups include acids, hydroxyls, amines, mercapto (thiols), benzophenone, acetophenone, acyl phosphine, thioxanthone, and derivatives of benzophenone, acetophenone, acyl phosphine, and thioxanthone.

In yet another embodiment of the subject matter there is provided a polymer emulsion composition comprising: at least one acrylic copolymer including a surfactant copolymerized with the acrylic block copolymer, the surfactant being chemically bound to the polymer chain, the acrylic copolymer including at least one first segment of controlled size and position and at least one second segment of controlled size and position that includes at least one monomer having a reactive functional group. The acrylic copolymer of the polymer emulsion composition may in certain embodiments also preferably comprise a third polymeric segment. The third polymeric segment preferably includes a reactive functionality and/or a nonreactive segment. Additional aspects as described in conjunction with the previously described preferred embodiment acrylic copolymers are included in the examples described herein.

As used herein, the term "molecularly miscible" means a compound or mixture of compounds that exhibit properties in the bulk state that can be observed and/or measured by one of ordinary skill in the art and are indicative of single phase behavior. The term "single phase behavior" refers to behavior or physical properties that are uniform or substantially so. With respect to the acrylic copolymer, the observation of a single $T_g$ is indicative of polymer segment miscibility. The single $T_g$ is intermediate between those of the constituent polymer segments and varies monotonically between these values as the relative amounts of each segment changes. In contrast to single phase behavior evidenced by a molecularly miscible compound or mixture of compounds, at a given temperature, a phase separated compound demonstrates multiple, independent sets of properties that are attributable to the different phases of matter present therein. Such sets of properties include, without limitation, $T_g$, solubility parameters, refractive index, and physical state/phase of matter. Accordingly, the term "phase separated" is defined as two or more substances which are molecularly segregated due to one or more chemical and/or physical properties dependent upon, without limitation, polarity, molecular weight, relative amounts of the polymer segments, and $T_g$ (phase of matter).

For purposes of this disclosure, the terms "end blocks" or "terminal blocks" of the polymer refer to end segments of the polymer. These end blocks or terminal ends have a number average molecular weight (Mn) less than about 50,000 g/mol; in other embodiments, the molecular weight may be less than about 30,000 g/mol, while in still additional embodiments, the molecular weight of the end blocks may be less than about 10,000 g/mol. However, it will be appreciated that the present subject matter end blocks may have molecular weights greater than about 50,000.

Methods of Forming the Polymers

The insolubility in water of the chain transfer agents used in controlled radical polymerization makes it difficult to prepare controlled architecture acrylate pressure sensitive adhesive (PSA) emulsion polymers using strictly conventional emulsion polymerization.

Figure 4:
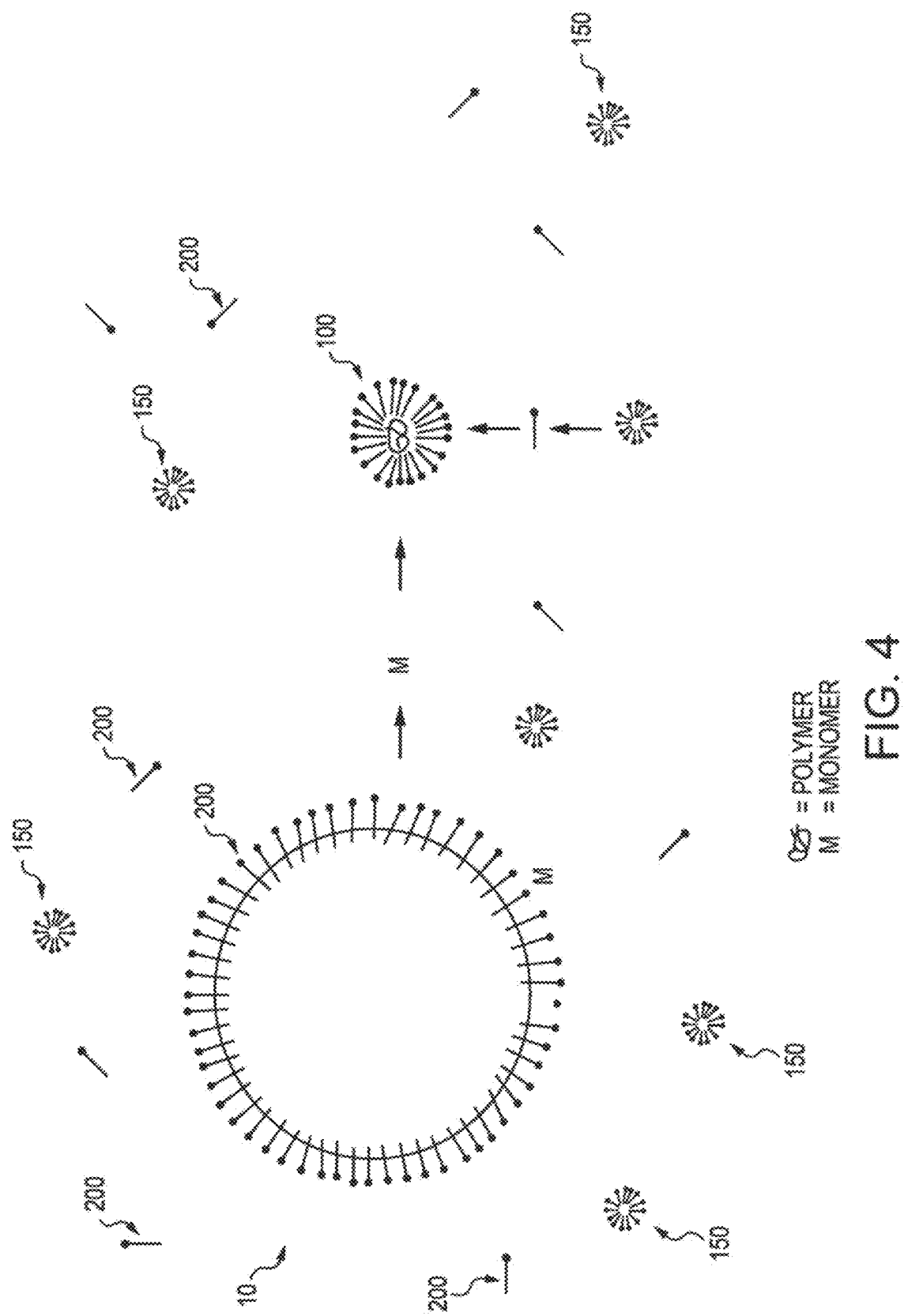
FIG. 4 is a schematic diagram illustrating aspects of preparing polymers in accordance with the present subject matter.

A significant aspect of the process of the present subject matter is that insoluble polymers are synthesized within surfactant stabilized polymer particles dispersed within a continuous aqueous phase. Reactive monomers are replenished within growing polymer particles by diffusion through the aqueous phase. Monomer needs to be replenished within polymer particles because monomer is continually transformed into polymer by the free radical addition reactions taking place within the particles. FIG. 4 schematically illustrates the relatively large monomer droplets 10 and monomer M transporting from those droplets through the aqueous phase to the growing polymer particles 100. At this stage of particle formation, the monomer droplets 10 are relatively large and may have a diameter of about 1 micron. During this stage of particle formation, the reaction rate is typically accelerating. FIG. 4 also shows small surfactant micelles 150 that provide surfactant 200 to keep droplets and particles stabilized during the process.

The majority of the various monomers used in the present subject matter are sparingly water soluble. The monomers are introduced to the reaction mixture as pre-emulsified droplets, which typically are in the form of monomer droplets stabilized by surfactants at their surfaces as depicted in FIG. 4. The monomers diffuse out of the monomer droplets and transport through the aqueous phase to the monomer depleted polymer particles. Concentration gradients drive the diffusion processes.

For the emulsion polymerization process to be efficient, small polymer particles are desired, typically less than 500 nm in diameter. This ensures an overwhelming availability of polymer particle surface area available for diffusing monomers to penetrate. A large available polymer particle surface area ensures that, when monomer enters the aqueous phase, it is quickly absorbed into polymer particles. Similarly, monomers are pre-emulsified to ensure that the monomer has plenty of opportunity to diffuse out of monomer droplets and into the aqueous phase. A large surface area to volume ratio, i.e., achieved through the use of small particles, provides that incentive for the monomers to enter the aqueous phase. Monomer droplets are not as small as polymer particles. They are micron sized. This size provides enough driving force via concentration differences, i.e., monomer droplet vs aqueous phase, to supply monomer to polymer particles efficiently.

Emulsions are prepared to overcome the immiscibility of the monomers and water. Monomers and polymers are typically only sparingly soluble in water. The various species are able to exist as stable dispersions in water by mixing the two components, i.e., water and monomer or water and polymer, in the presence of surfactant. The surfactants effectively chemically camouflage the droplet surfaces, "tricking" the aqueous phase into behaving as if the droplets are miscible in the continuous phase. The surfactants have two ends that are chemically different. The surfactants are located on or near the surface of monomer and polymer particle droplets. Their water-loving/charged ends point to the aqueous phase and their oil-loving/non-polar ends point toward the droplet monomer/polymer-rich interiors.

As previously noted, molecules of controlled radical polymerization chain transfer agents (CRP agents) do not behave in accordance with typical emulsion polymerization process rules. They are not sufficiently soluble to transport through the aqueous phase. Their water solubility is too low. As a consequence it is generally not possible to easily incorporate CRP agent molecules into the polymer particles using a conventional emulsion polymerization approach. Instead, an approach of the present subject matter is to introduce the CRP agent(s) in pre-made polymer particles at the beginning of the emulsion polymerization process. A mini-emulsion process can be utilized for this step.

Rather than create polymer particles "on the fly" as per many conventional emulsion polymerization processes, a mini-emulsion is used to create the initial set of polymer particles (known as the polymer seed latex). The CRP agent (provided in the form of a pre-polymerized CAA oligomer molecule, as described in greater detail herein, is incorporated in this initial particle set, as a solution in monomer (i.e. CRP agent(s) dissolved in the monomer(s)). Placing the CRP agent within the initial seed particles offers the opportunity for the polymerization process to be CAA mediated from the outset. When the initial monomer is consumed, a semi-batch feed process is used to replenish the monomer. The semi-batch feed process is one where monomer starved polymer particles are continuously replenished with monomer via a feed of emulsified monomer in water. Because the CRP agent is located within the polymerizing polymer particles, it continues to control the polymerization process of the present subject matter. As described in greater detail herein, one or more mini-emulsion co-stabilizer(s) can be used.

The use of the noted mini-emulsion allows the preparation of stable nano-sized droplets of monomer in aqueous dispersion. Since CRP agent (in the form of CAA oligomers) is pre-dissolved in monomer, each mini-emulsion monomer droplet will contain a CRP agent(s). These nano-sized monomer droplets are efficiently converted to polymer particles via the use of thermal initiators. The thermal initiator may be dissolved within the monomer mixture prior to forming the mini-emulsion or it may be added as an aqueous solution to the aqueous phase. Using the appropriate concentration of CRP agent and initiator, the nano-sized monomer droplets are converted to nano-sized polymer particles as they begin to polymerize via CRP agent mediation from the outset. The overwhelmingly large polymer particle surface area provided by the nano-sized polymer particles of the present subject matter effectively absorb monomer from the water phase when it comes to time to replenish the monomer. This means that initial monomer droplets are needed which have diameters less than about 500 nm and in certain embodiments, less than 300 nm. Although diameters less than about 500 nm are used in many embodiments of the present subject matter, it is contemplated that in certain applications, larger particles could be used such as up to about 2,000 nm. When stable nano-sized monomer droplets are achieved, they can be readily converted to stable nano-sized polymer droplets by activating the thermal initiator to cause the polymerization reaction to occur. Ideally, all the monomer droplets are transformed to polymer particles. Once polymer particles are formed, standard emulsion polymerization processes can be used, provided radical flux is maintained at low enough levels to ensure the free-radical polymerization remains a CRP agent mediated one. Controlling the size and number of polymer particles at the beginning of reactions is beneficial for a number of reasons. One reason is that the batch to batch variation is reduced as compared to conventional emulsion polymerization.

A difference between standard monomer emulsion and a mini-emulsion process is the use of high energy mixing, i.e., high shear mixing and one or more co-stabilizer(s) to create mini-emulsion nano-dispersions. High shear mixing provides the means to violently rip micron-sized monomer droplets apart. The micron-sized droplets can be reduced to nano-sized droplets using high shear mixing. However, without co-stabilizer added to the monomer phase, those monomer nano-droplets quickly "Ostwald ripen" back to micron sized particles. Ostwald ripening is a process in which monomer diffuses from nano-sized droplets to micron sized and larger droplets. It is a thermodynamically driven process. There is a high energy cost in maintaining small droplets, where there is very large surface area to volume ratios. It is energetically favorable for the sparingly soluble monomers to exist as much larger particles.

The mini-emulsion co-stabilizer is an extremely water-insoluble material. Co-stabilizers are hydrophobic and are soluble in hydrophobic acrylic monomers. Within academia, co-stabilizers are usually hexadecane or other small molecule, water insoluble solvents. They are used at levels of around 5% by weight based on monomer. They typically function as follows.

Osmotic pressure is a force relied upon by the present subject matter methods. Due to its very low water solubility, the co-stabilizer is compelled to remain inside the droplet. Ostwald ripening drives changes in droplet size but monomer diffusion out of the droplet will lead to higher co-stabilizer concentration inside the droplet. It is osmotic pressure that acts to prevent monomer from diffusing out of the particle and thereby driving the co-stabilizer concentration within droplets higher. The nano-dispersions thus formed are kinetically stable and their nano-size can remain unchanged for weeks.

The present subject matter methods utilize one or more copolymerizable co-stabilizer(s). A nonlimiting example of such a stabilizer is heptadecyl acrylate, an acrylate with 17 carbons that is a sufficiently small molecule and is highly water insoluble. The small size contributes to its required mobility as a co-stabilizer. This co-stabilizer is a reactive acrylate with a low glass transition temperature (Tg). As a reactive acrylate, heptadecyl acrylate readily copolymerizes with the monomers employed and its low glass transition temperature and hydrophobic nature makes it a useful component monomer for constructing polymers used in PSAs. This co-stabilizer is also liquid at ambient temperature which makes it easy to handle at production scale. It will be understood that the present subject matter includes the use of other co-stabilizers.

In accordance with the present subject matter, it has been discovered that synthesizing emulsion PSAs using CRP agent control in isolation is not enough to deliver high adhesion performance. In accordance with the present subject matter, it is believed that when a controlled architecture acrylate PSA is prepared with conventional surfactants, the surfactant remains free to migrate to the dried polymer film interface where the surfactant forms a weak boundary layer. This layer will exist between the PSA film and the adherent after application of a label or tape. The surfactant layer inhibits complete surface wetting of the adherend by the adhesive layer. When the adhesive tape or label is stressed, e.g., such as during peeling, it is the weak boundary layer formed by the surfactant that fails first. That is, the bond maintaining the adhesion of the tape to the adherent surface fails at the boundary between the surfactant and the adherend. The weak surfactant layer at the interface fails before the adhesive performance potential of the PSA layer can be fully realized.

To prevent the formation of the surfactant-rich weak boundary layer, conventional surfactants have been replaced with one or more copolymerizable surfactant(s). When polymerizable surfactants, also known as reactive surfactants, are used, they react to form part of the polymer chain. The surfactants are able to continue to provide their particle stabilizing function when they combine with the polymer. The polymer is flexible enough to allow the hydrophilic portion of the surfactant molecule to exist at the polymer particle surface where it orientates toward the aqueous phase. In addition, the reactivity of the surfactant molecules is also a little less toward polymerization than the monomers. As a consequence, incorporation of the surfactant molecules occurs, or at least partially occurs, toward the end of the polymerization process. This aspect preserves maximum surfactant stabilization of polymer particles during most of the reaction period. When adhesive films are cast from the present subject matter controlled architecture acrylate (CAA) polymer emulsions, such as during manufacture of tapes for example, the surfactant is no longer free to migrate to the adhesive/air interface. The surfactant is bound to polymer chains and unable to form a surfactant rich, weak boundary layer at the polymer surface.

In certain embodiments of the present subject matter, the CRP agent is the RAFT agent dibenzyl trithiocarbonate (DBTTC). While possible, in these embodiments, a raw form of DBTTC is not used in the present subject matter mini-emulsion and emulsion polymerization processes to make CRP agent controlled PSA polymers. Instead, the CRP agent is converted into a small controlled architecture acrylate polymer or oligomer using solvent polymerization as one or more initial step(s) in the preparation of CAA polymer emulsions. This practice is followed because, even when using the mini-emulsion process, polymerization using RAFT agents in emulsion systems can be problematic. It has been found that those difficulties can be managed when CRP agent is introduced to the emulsion system as a small CRP agent "starter" oligomer. In particular embodiments, the CAA oligomers used in the present subject matter have ranged in size from a number average molecular weight (Mn) of about 500 to about 50,000 g/mol, in other embodiments from about 1,000 to about 25,000 g/mol, and in certain embodiments from about 2,500 to about 10,000 g/mol. However, it will be appreciated that the present subject matter CAA oligomers may have molecular weights greater than about 50,000 and/or less than about 500 g/mol. Problems encountered using CRP agents not introduced as pre-formed oligomers include loss of CRP agent control when CRP agent fragments desorb from polymer particles or the super-swelling of polymer particles with monomer during early stage of polymerization, when the degree of polymerization is small and monomer solubility is high.

Figure 5:
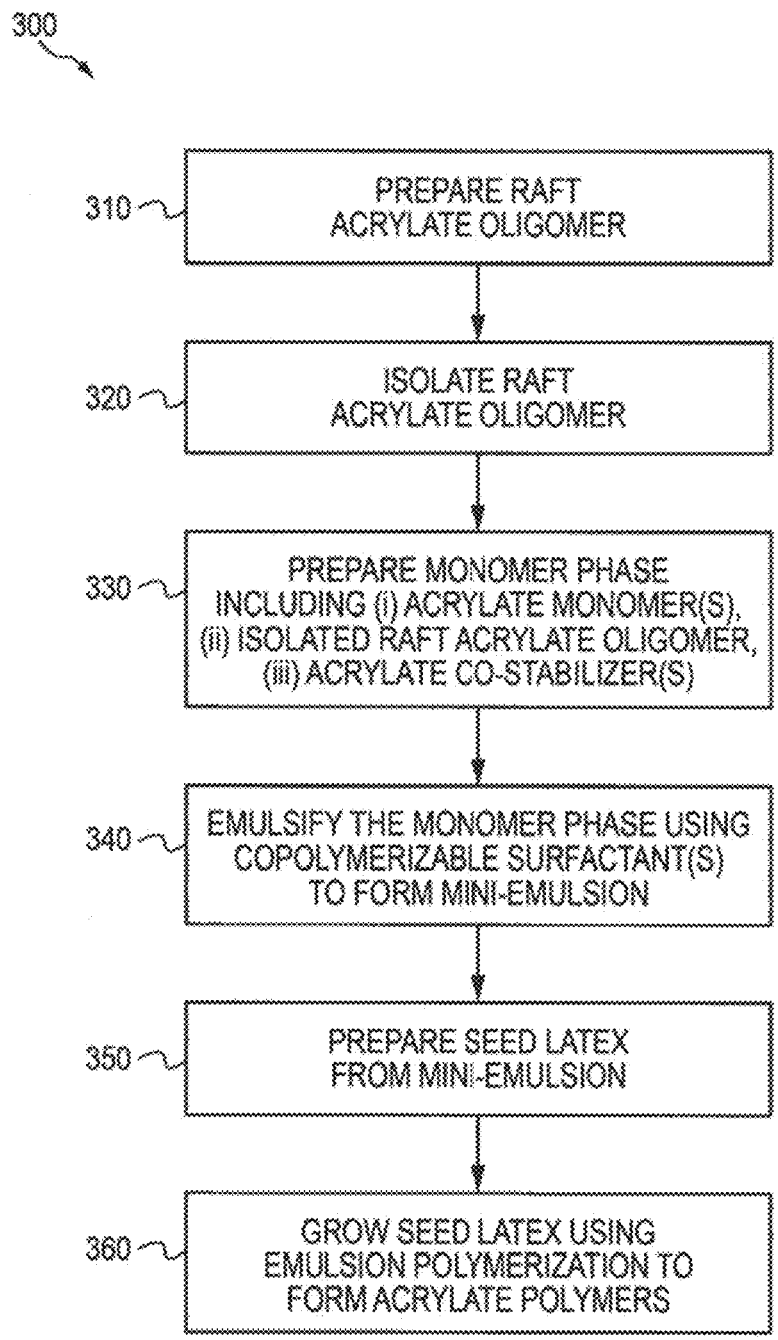
FIG. 5 is a flowchart illustrating a method of forming polymers in accordance with the present subject matter.

Referring to FIG. 5, in summary, a RAFT emulsion adhesive preparation process 300 in accordance with the present subject matter comprises the following operations. A RAFT acrylate oligomer is prepared typically via solvent polymerization, i.e., operation(s) 310. The RAFT oligomer is isolated such as by solvent evaporation as shown by operation(s) 320. A monomer phase including acrylate monomer, RAFT oligomer and a co-stabilizer such as a C17 acrylate is prepared, i.e., operation(s) 330. Mini-emulsification of the monomer phase is then performed using copolymerizable surfactant and water, i.e., operation(s) 340. A seed latex is then prepared such as by thermal initiation of the mini-emulsion, i.e., operation(s) 350. The seed latex is then grown via an emulsion polymerization process, i.e., operation(s) 360.

In certain embodiments of the present subject matter, a tackifier selected from the group consisting of a hydrocarbon resin, hydrogenated hydrocarbon resin, a fully hydrogenated hydrocarbon resin, a hydrogenated rosin ester, a fully hydrogenated rosin ester, and combinations thereof may be included in the monomer phase preparation step, i.e., operation(s) 330. Mini-emulsification of the tackifier containing monomer phase is then performed using a copolymerizable surfactant(s) and water, i.e., operation(s) 340. A seed latex is then prepared such as by thermal initiation of the mini-emulsion, i.e., operation(s) 350. The seed latex is then grown via an emulsion polymerization process, i.e., operation(s) 360. In particular embodiments, the tackifier(s) used in the present subject matter have a concentration range of about 2 to about 30% by weight of the total monomer(s), in other embodiments from about 2 to about 18% by weight of the total monomer(s), in certain embodiments from about 2 to about 15% by weight of the total monomer(s), from in still other embodiments from about 2 to about 12% by weight of the total monomer(s). However, it will be appreciated that the present subject matter may have tackifier(s) having a concentration range greater than about 30% and/or less than about 2%.

The various methods and operations of forming acrylate polymers in accordance with the present subject matter are described in greater detail as follows.

Preparing RAFT Oligomers

It should be noted that the method disclosed herein is applicable not only to the preparation of RAFT acrylate oligomers but also to the preparation of controlled architecture acrylates (CAA) oligomers using other controlled radical polymerization agents (CRP agents)/processes, e.g. stable free radical mediated polymerization (SFRP), atomic transfer radical polymerization (ATRP), etc. The methods of the present subject matter include one or more operations 310 in FIG. 5 of preparing RAFT acrylate oligomers. Typically, such preparations are performed by solvent polymerization using RAFT techniques. However, it is contemplated that the RAFT acrylate oligomers could be prepared by other polymerization techniques besides solvent polymerization.

In many embodiments, a RAFT acrylate oligomer(s) is prepared by combining (i) one or more acrylate monomers, (ii) one or more RAFT agents, and optionally (iii) one or more comonomers which may be non-acrylates.

A wide array of acrylate monomers can be used to form the RAFT acrylate oligomers. Nonlimiting examples of such acrylate monomers include acrylates, methacrylates, or mixtures thereof. The acrylates include C1 to about C20 alkyl, aryl or cyclic acrylates such as methyl acrylate, ethyl acrylate, phenyl acrylate, butyl acrylate, 2-ethylhexyl acrylate, n-hexyl acrylate, n-heptyl acrylate, n-octyl acrylate, n-nonyl acrylate, isobornyl acrylate, 2-propyl heptyl acrylate, isodecyl acrylate, isostearyl acrylate and the like. These compounds typically contain from about 3 to about 20 carbon atoms, and in one embodiment about 3 to about 8 carbon atoms. The methacrylates include C1 to about C20 alkyl, aryl or cyclic methacrylates such as methyl methacrylate, ethyl methacrylate, butyl methacrylate, 2-ethylhexyl methacrylate, phenyl methacrylate, acetoacetoxyethyl methacrylate, isobornyl methacrylate, isooctyl methacrylate, and the like. These compounds typically contain from about 4 to about 20 carbon atoms, and in one embodiment about 3 to about 10 carbon atoms.

Various RAFT agents can be used to form the RAFT acrylate oligomers. Typical RAFT agents contain thiocarbonyl-thio groups, and include, for example, dithioesters, dithiocarbamates, trithiocarbonates and xanthenes. Examples of useful RAFT agents include those described in *The Chemistry of Radical Polymerization*, Graeme Moad & David H. Solomon, 2nd rev. ed., 2006, Elsevier, p. 508-514. Nonlimiting and particular examples of such RAFT agents include the previously noted DBTTC.

A wide array of comonomers can optionally be used in forming the RAFT acrylate oligomers. Nonlimiting examples of such comonomers include one or more crosslinkable silyl, hydroxyl, carboxyl, carbonyl, carbonate ester, isocyanato, epoxy, vinyl, amino, amide, imide, anhydride, mercapto, acid, acrylamide and acetoacetyl groups.

Hydroxy functional comonomers include, for example, hydroxy ethyl(meth)acrylate, hydroxy isopropyl(meth)acrylate, hydroxy butyl(meth)acrylate and the like. Epoxy functional monomers include, for example, glycidyl methacrylate and glycidal acrylate.

The acid containing comonomers include unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like. Anhydride containing monomers include maleic anhydride, itaconic anhydride, citraconic anhydride and the like.

The acrylamides include acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

The polymerizable silanes include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl)methyldimethoxysilane, (methacryloxymethyl)-methyldiethoxysilane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, acryloxypropyl-methyldipropoxysilane, and the like.

In addition to the comonomer having functional group(s), the comonomer may include at least one segment having the formula:

(II)

where R3 is H or CH3 and R4 is a branched or unbranched, saturated alkyl group having 4 to 14 carbon atoms.

The RAFT acrylate oligomers typically have a number average molecular weight (Mn) in a range of from about 500 to about 50,000 g/mol, in other embodiments from about 1,000 to about 25,000 g/mol, and in certain embodiments from about 2,500 to about 10,000 g/mol. However, it will be appreciated that the present subject matter RAFT acrylate oligomers may have molecular weights greater than about 50,000 and/or less than about 500 g/mol.

Isolating RAFT Oligomers

After formation of the RAFT oligomers, typically the oligomers are isolated from the reaction system. This is shown as operation(s) 320 in FIG. 5. In many embodiments, the RAFT oligomers are isolated by removing solvent. Solvent removal can be performed by a variety of techniques such as by evaporation for example. In many applications evaporation of solvent is performed at reduced pressures to avoid heating the oligomers. However, heat can be used to evaporate solvent or other liquid(s) and thereby isolate the RAFT oligomers.

Preparation of Monomer Phase

The methods of the present subject matter also include one or more operations of preparing a monomer phase, shown as 330 in FIG. 5. The monomer phase includes (i) one or more acrylate monomers, (ii) the isolated RAFT acrylate oligomer, (iii) one or more acrylate co-stabilizers, optionally (iv) one or more other comonomers, optionally (v) one or more tackifiers, and optionally (vi) one or more oil soluble thermal initiators. An example of a tackifier is Foral AX-E, a fully hydrogenated rosin ester tackifier from Eastman or Regalite R1090, a hydrocarbon resin tackifier, also from Eastman. However, it will be understood that the present subject matter includes the use of a variety of tackifiers such as tackifier(s) selected from the group consisting of a hydrocarbon resin, hydrogenated hydrocarbon resin, a fully hydrogenated hydrocarbon resin, a hydrogenated rosin ester, a fully hydrogenated rosin ester, and combinations thereof. An example of an oil soluble thermal initiator is Vazo 64 available from Dupont. Vazo 64 is 2,2'-azobisisobutyronitrile. However, it will be understood that the present subject matter includes the use of a variety of oil soluble or water soluble thermal initiators such as persulfates.

A wide array of acrylate monomers can be used in this operation. Any of the previously noted monomers used in forming the RAFT acrylate oligomer can be used. The acrylate monomers used in this operation can also be different than those used in forming the RAFT acrylate oligomers.

The acrylate co-stabilizers are generally C6 to C20 acrylates. These stabilizers can include a C17 acrylate and in certain versions heptadecyl acrylate.

A variety of other comonomers can optionally be included in the monomer phase. Nonlimiting examples of such comonomers include any of the previously noted comonomers used in forming the RAFT acrylate oligomer can be used. The comonomers used can be different or the same as those used in forming the RAFT acrylate oligomers.

Forming Mini-Emulsion

The monomer phase is emulsified using one or more copolymerizable surfactants to form a mini-emulsion, shown as operation(s) 340 in FIG. 5. Emulsification can be performed using high speed blenders and emulsification equipment as known in the art.

An array of surfactants can be used in this operation so long as the one or more surfactants are copolymerizable. Nonlimiting examples of copolymerizable surfactants include allyl or vinyl substituted alkyl phenolethoxylates and their sulfates, block copolymers of poly ethylene oxide, propylene oxide or butylene oxide with polymerizable end groups, allyl or vinyl substituted ethoxylated alcohols and their sulfates, maleate half esters of fatty alcohols, monoethanolamide ethoxylates of unsaturated fatty acids capable of undergoing antioxidative polymerization, allyl or vinyl polyalkylene glycol ethers, alkyl polyalkylene glycolether sulfates, functionalized monomer and surfactants, and combinations thereof.

The mini-emulsion which is prepared comprises the previously described monomer phase and the copolymerizable surfactant(s). The particles in the mini-emulsion typically have particle sizes within a range of from 2,000 to 10 nm, particularly from 500 to 10 nm, and in certain embodiments from 300 to 10 nm. In many embodiments, at least about 90% of the particles in the mini-emulsion have a particle size within the noted range(s).

Preparing Seed Latex

After formation of the noted mini-emulsion, a seed latex is prepared, as shown as operation(s) 350 in FIG. 5. The seed latex is formed by transforming the mini-emulsion monomer droplet dispersion into a dispersion of polymer particles via thermal initiation with a thermally activated, oil soluble initiator (previously dissolved within the monomer phase). The mini-emulsion is heated in a stirred reactor to reaction temperature (approximately 75° C.) and held until about at least 80% monomer to polymer conversion is achieved (measured gravimetrically). This typically takes 2 to 5 hours. Alternatively, transformation of the mini-emulsion from nano-droplets of dispersed monomer to dispersed polymer could be achieved using a water soluble initiator such as sodium persulfate added to the aqueous phase and heating as noted above. The seed step allows for the creation of stabilized polymer particles containing RAFT controller. The seed polymer need only have a small molecular weight, for example 1000 g/mole or more. The purpose of the seed preparation step is to prepare a surfactant stabilized polymer using RAFT controlled free-radical polymerization. The polymer within the seed particles can be further polymerized (extended) to achieve the higher molecular weights required for good adhesive performance (usually at least two times the entanglement molecular weight (Me) of the polymer formed). Seed polymer extension can be achieved by adding monomer emulsion and a low concentration of initiator via a conventional, semi-batch emulsion polymerization process. The introduced monomer will swell the polymer seed particles and the initiator will re-establish RAFT mediated free-radical polymerization within the monomer swollen particles. Concentration gradients will act to replenish monomer within the polymer particles as it is consumed.

The seed polymer latex can be polymerized to higher molecular weight immediately or it may be stored and processed at a later time.

If a sufficiently high mass of monomer is incorporated within the initial mini-emulsion monomer dispersion, the seed polymer particles can be used directly as a high performance PSA. Monomer and RAFT oligomer ratios may be adjusted to enable high polymer Mn to be achieved during the seed stage. If the Mn formed is at least two times the Me of the formed polymer, the PSA will exhibit good PSA properties after cross-linking.

The seed latex can be prepared from the mini-emulsion by a thermal initiation process, as previously described.

Growing Seed Latex

The seed latex is grown, i.e., operation(s) 360 in FIG. 5, using pre-emulsion and initiator solution feeds according to a standard semi-batch emulsion polymerization approach. The RAFT mediated free radical polymerization takes place slowly given the requisite low initiator concentrations to maintain controlled polymer growth. Typical acrylate pre-emulsion compositions can be used with the exception that reactive surfactant must be the principal surfactant. The monomer emulsion is fed into the reaction mixture along with a small amount of initiator. Polymer dispersions with solids content of about 45 to about 63% with Mn in the order of 200,000 g/mole with PDI less than 4.0 can be prepared. The ultimate solids/Mn balance will be determined, in part, by the ratio of RAFT agent to monomer in the initial seed preparation. High RAFT to monomer ratios will provide for lower ultimate Mn. Consideration should be given to the initial seed particle size to enable optimum solids and Mn distributions. Energy input during the dispersion step together with surfactant concentration, RAFT oligomer concentration and monomer choice are important parameters in controlling dispersion particle size.

Monomer pre-emulsion and initiator feed times will approximately match the polymerization rate so as to avoid accumulating a large excess of unreacted monomer within the reactor at any given time. Feed time and mass of feed monomer will depend on the initial Mn of the seed and the target Mn for the finished product. Typically, a seed polymer with Mn of approximately 25 Kg/mole grown to about 100 Kg/mol will require a pre-emulsion feed time of around 4 hours.

In certain embodiments, consideration must be paid to reducing residual monomer and reactive surfactant levels after feed completion. Often the reactive surfactants, in particular, are slow to incorporate and require the batch be held for additional time at elevated temperature after feed completion. In the case of an allyl functional surfactant, incorporation is aided by a shot of initiator after feed completion. The RAFT mediated polymerization process also means that monomers are incorporated slowly. Extended period at elevated temperature and a shot or feed of peroxy initiator also aids achieving monomer conversions above 98%.

In many embodiments, growing of the seed latex is performed by an emulsion polymerization process.

In accordance with the present subject matter, a significant aspect is the combined use of RAFT control and polymerizable surfactants to deliver high performance emulsion PSAs.

Post-Polymer Formation

After formation of the present subject matter polymers, a variety of post-formation operations can be undertaken such as but not limited to crosslinking, incorporation of fillers and additives, and curing.

Crosslinking Agent

The adhesive may be crosslinked during post curing of the adhesive to increase the cohesive strength of the pressure sensitive adhesive. This can be achieved via covalent crosslinking such as heat, actinic or electron beam radiation, or metal based ionic crosslinking between functional groups. Table 1 below lists the types of crosslinkers for the various functional groups of the segmented polymer.

TABLE 1

Possible Crosslinkers for Polymers

| Functional Group of Polymer | Crosslinker |
|---|---|
| Silane | Self-reactive |
| Hydroxyl | Isocyanate, Melamine Formaldehyde, Anhydride, Epoxy, Titanium esters and Chelates |
| Carboxylic acid, phosphoric acid | Anhydride, Epoxy, Carboiimides, Metal Chelates, Titanium esters and Oxazolines |
| Isocyanate, Vinyl | Self-reactive, Carboxylic acid, Amine, Hydroxyl |
| (Meth)acrylate | Addition reaction with Silicone hydride Amine, Mercaptan, Self-reactive with radical catalyst (UV, Thermal), Acetoacetate |
| Epoxy | Amine, Carboxylic acid, Phosphoric acid, Hydroxyl, Mercaptan |
| Amine | Isocyanate, Melamine formaldehyde, anhydride, epoxy, acetoacetate |
| Mercapto | Isocyanate, Melamine formaldehyde, Anhydride, Epoxy |
| Acetoacetate | Acrylate, Amine |

The adhesives of the present subject matter may further comprise additives such as pigments, fillers, plasticizer, diluents, antioxidants, tackifiers and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, christobalite, glass fibers, kaolin, precipitated or fumed silica, copper, quartz, wollastonite, mica, magnesium hydroxide, silicates (e.g. feldspar), talc, nickel and calcium carbonate are also useful. Metal oxides such as aluminum trihydrate and magnesium hydroxide are particularly useful as flame retardants.

A wide variety of tackifiers can be used to enhance the tack and peel of the adhesive. These include hydrocarbon resin tackifiers, rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

EXAMPLES

Polymers were synthesized with target glass transition temperatures (Tg) of −20° C. using predominantly n-butyl acrylate and t-butyl acrylate monomers. 0.6% by weight of methacrylic acid was included in each polymerization. RAFT mediated polymerizations were conducted via miniemulsion polymerization using a pre-made RAFT oligomer dissolved in the monomer phase together with a small amount of heptadecyl acrylate as a hydrophobe.

The RAFT oligomer was prepared in a solvent system. The formulation was as provided in Table 2 as follows.

TABLE 2

Representative Formulation for Forming RAFT Oligomer

| | % Total | Lab Batch |
|---|---|---|
| Reactor Charge | | |
| Ethyl Acetate | 44.3373 | 520.00 |
| Methacrylic Acid | 4.3519 | 51.04 |
| Butyl Acrylate | 46.1961 | 541.80 |
| DBTTC 100% | 1.4657 | 17.19 |
| Initiator | | |
| Vazo-64 | 0.1107 | 1.298 |
| Ethyl Acetate | 3.5384 | 41.50 |
| Reactor Charge Total | 100.0000 | 1,172.83 |

The recipe stoichiometry set forth in Table 2 was designed to deliver a 10,000 g/mol polymer with 5 MAA molecules per polymer end. The reaction was carried out at 80° C. and when complete (i.e., conversion >98%), the solvent (ethyl acetate) was stripped from the polymer solution using rotary evaporation at 60 deg C. The Mn of the isolated polymer was measured and found to be approximately 9,500 g/mole with a PDI of approximately 1.5. These oligomers were then utilized to make the RAFT mediated emulsion polymers.

The RAFT mediated polymerizations yielded polymers having a molecular weight of approximately 150,000 g/mol and low polydispersity (PDI) as shown in Table 3 as Polymer Samples 1 and 2. Each polymer dispersion was neutralized to a pH within a range of 8.5 to 9.5 using ammonia solution before adding CX100 aziridine crosslinker at equivalent stoichiometric weight based on available methacrylic acid.

Polymer latex films were prepared by drawing down the latexes containing crosslinker directly to 2 mil polyethylene terephthalate (PET) film. The wet adhesive films were dried and cured in a convection oven at 120° C. for 5 minutes before laminating to silicone coated glassine release paper.

Adhesive coat weight of prepared laminates was measured by weighing a 100 mm×100 mm section of adhesive coated PET. The weight of a 100 mm×100 mm uncoated sample of PET was subtracted and the result multiplied by 100 to obtain a coat weight estimate in $g/m^2$.

180° peel adhesion after 24 hours dwell to stainless steel was measured by applying a 1 inch wide strip of test laminate to a stainless steel panel with a 5 pound roller with 1 pass in each direction. Samples were conditioned and tested at 23° C. After 24 hours dwell, the average peel force was measured over at least 20 mm of tests strip three times.

Static shear was measured by adhering a ½ inch by ½ inch area of a looped test strip to a stainless steel panel and rolling with a 5 pound roller with one pass in each direction. After allowing the test strips to dwell overnight, a 500 g test weight was hung via the loop formed in the test strip and the time to failure recorded.

Dynamic Mechanical Analysis (DMA) was performed on a TA Instrument AR-2000 rheometer using parallel plate clamps. 1.0 mm thick samples were placed in the clamp and annealed at 50° C. for 10 minutes to ensure good adhesion. The samples were then cooled to −50° C. for 10 minutes and ramped at 3° C. per minute up to 180° C. During the temperature ramp the sample was oscillated at a frequency of 10 rad/s.

ering peel forces over 6 lb/inch. Another unexpected result is that the polymers of the present subject matter achieve excellent transfer coat without the inclusion of post-added wetting agents such as DOSS. Polymer Samples 2 (RAFT/Polymerizable surfactant) and 3 (Non-RAFT/Polymerizable surfactant) returned average static shears of greater than 10,000 minutes.

In many embodiments of the present subject matter, a significant performance benefit is the improved high temperature adhesion performance.

It is also believed that in many embodiments, adhesives formed in accordance with the present subject matter will exhibit improved resistance to shear at higher temperatures, as typically measured by Shear Adhesion Failure Testing (SAFT).

In particular embodiments, the adhesives of the present subject matter may exhibit improved resistance to water whitening when immersed in water.

Hot Water Resistance Test

A hot water resistance test was developed to simulate the effect of pasteurization and as a standard method to determine candidate adhesive polymer opacity. Opacity is the ratio of the reflectance of a sample backed with a white background to that of a sample backed with a black background, multiplied by one hundred, and reported as percent opacity. In the test, a pressure sensitive adhesive is coated to a thickness of 1 mil on a clear 2 mil biaxially oriented polypropylene (BOPP) facestock or backing, dried at 60° C. in an oven for 10 min. and cooled. After cooling, the film facestock or backing is immersed in a beaker of hot water

TABLE 3

Sample Polymers and Results of Evaluation

| Polymer Sample | RAFT Control | Molecular Weight | PDI | Tg (° C.) | Surfactant Type | Tan Delta at 90° C. | Test Laminate Coat Weight ($g/m^2$) |
|---|---|---|---|---|---|---|---|
| 1 | Yes | 164060 | 2.15 | −20.1 | Conventional | 0.417 | 28.4 |
| 2 | Yes | 153360 | 1.64 | −21 | Polymerizable | 0.382 | 28.2 |
| 3 | No | NA | NA | −18.4 | Conventional | 0.124 | 33.2 |
| 4 | No | NA | NA | −18.4 | Polymerizable | 0.124 | 37.4 |

Molecular weight was not measured for non-RAFT polymers (Polymer Samples 3 and 4) since they contained significant gel fraction.

Figure 6:
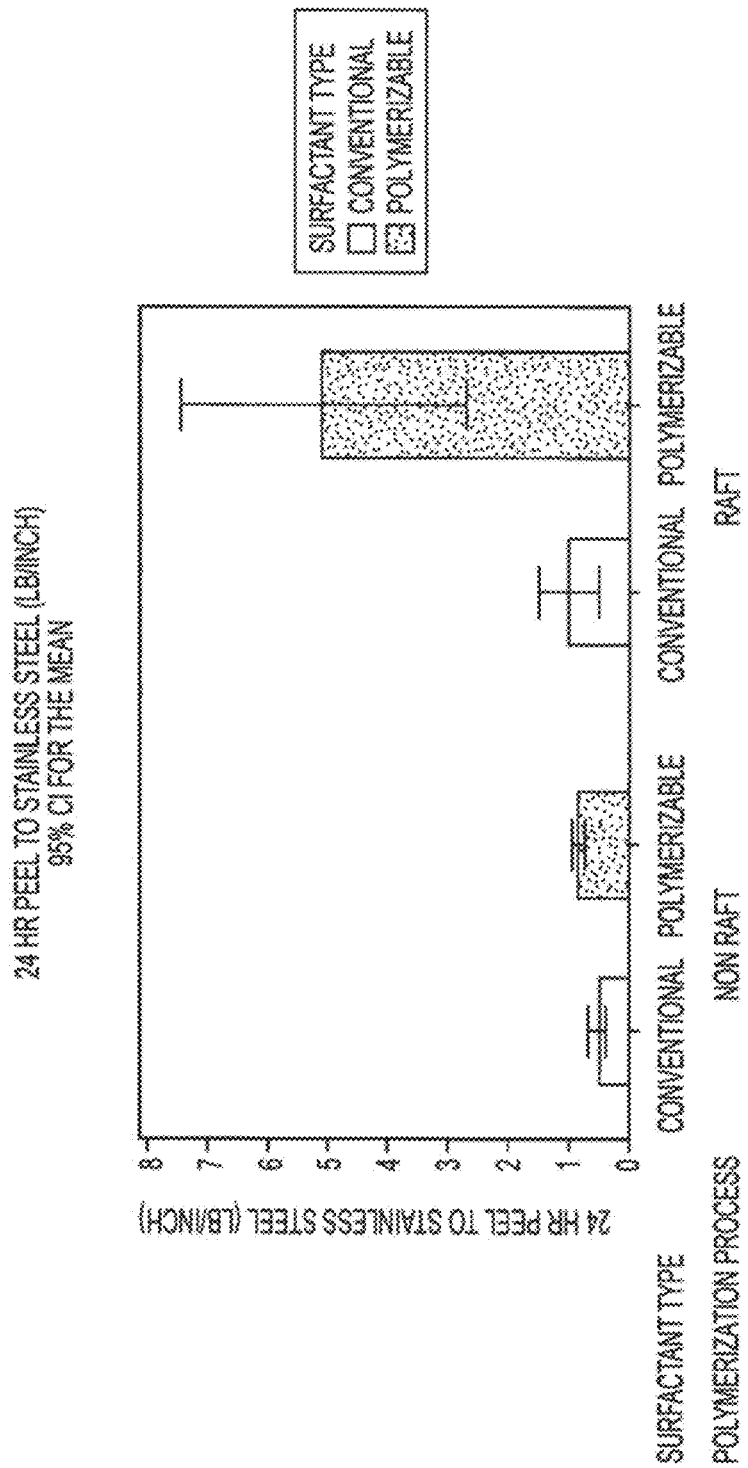
FIG. 6 is a graph of 24 hour peel adhesion testing in which polymers formed in accordance with the present subject matter were compared to conventionally prepared polymers.
Figure 7:
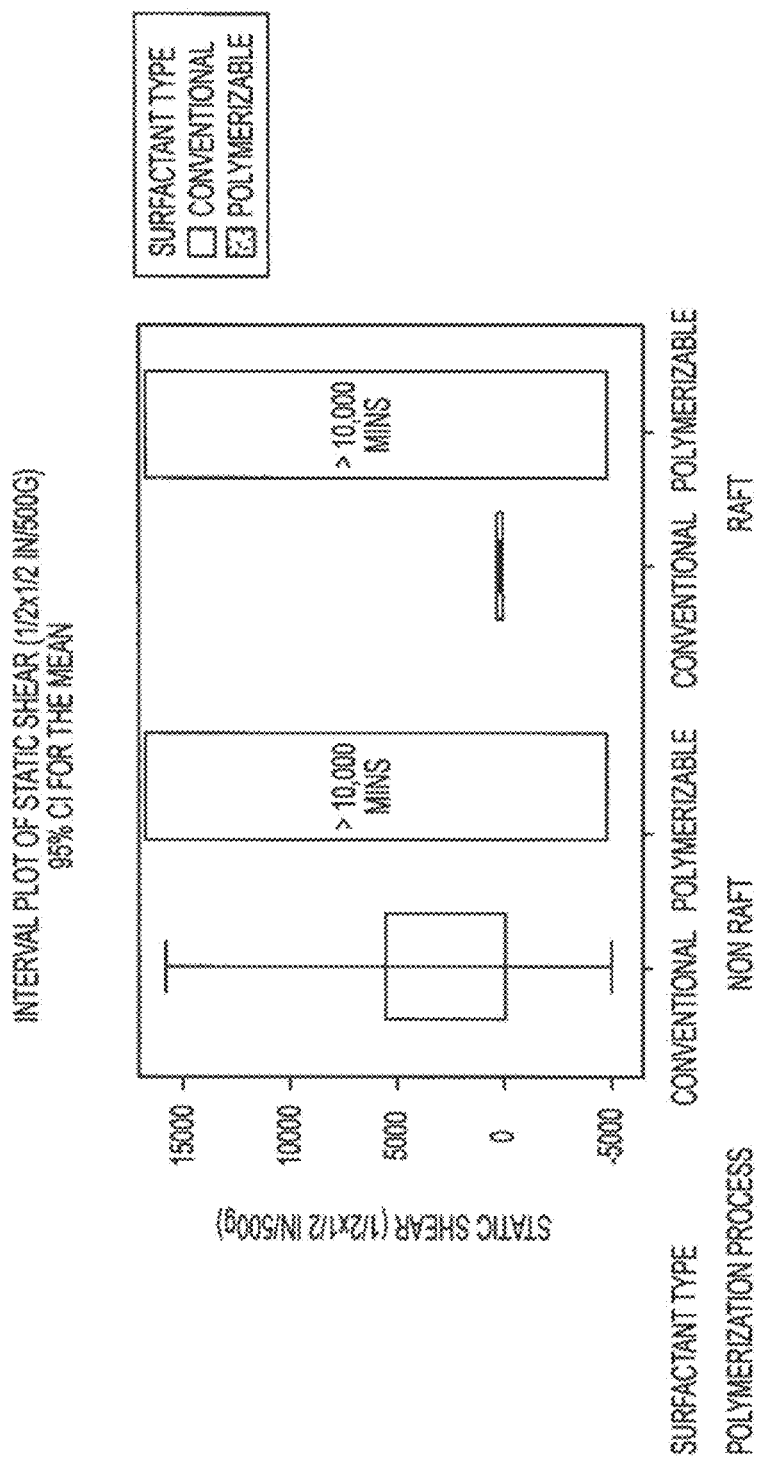
FIG. 7 is a graph of static shear testing in which polymers formed in accordance with the present subject matter were compared to conventionally prepared polymers.

FIGS. 6 and 7 illustrate that a combination of using RAFT polymerization with a polymerizable surfactant delivers high peel and high shear characteristics. FIG. 6 demonstrates that a peel force of approximately 5 pounds is achieved by combining the use of a RAFT process with a polymerizable surfactant as compared to a peel force of only about 1 pound for polymers using the same monomers via conventional polymerization, RAFT polymerization alone, and polymerizable surfactant alone. FIG. 7 illustrates the shear test results.

As shown in FIGS. 6 and 7, greatly increased 24 hour peel adhesion force was achieved without sacrificing static shear via enhanced substrate wetting. The original peel adhesion results for RAFT polymers using reactive surfactants presented here returned cohesive failure mode at 24 hours dwell. More recent examples of emulsion PSA using RAFT and reactive surfactants made via seeded semi-batch process yield polymers with very high static shear, i.e., greater than 10,000 mins using ½ inch by ½ inch and 500 g, and with peels demonstrating clean/adhesive failure mode and deliv- (65° C.) for 60 min. The PSA coated facestock is then immediately laminated to a clear 2 mil polyester film with a plastic squeegee and opacity of the resultant laminate determined using a spectrocolorimeter (Hunter Lab ColorQuest 45/0). Percentage opacity for the immersed sample is compared to a sample that has not been immersed and the difference is recorded as Delta Opacity. An opacity increase of up to about 6% is regarded as good. An opacity increase of up to about 2.5 is regarded as excellent. An opacity increase above 10.0% is regarded as poor for applications requiring a non-water whitening PSA. In particular embodiments, the present subject matter adhesives have a delta opacity of less than 10%, in other embodiments less than 6%, and in certain embodiments less than 2%, Adhesives using polymers of the present subject matter were prepared and compared to two currently known adhesives. Table 4 set forth below, present various properties of an emulsion adhesive of the present subject matter (designated as "Advanced Emulsion") with (i) a currently known high performance solvent acrylic adhesive and (ii) a currently known low cost solvent acrylic adhesive.

TABLE 4

Comparison of Adhesive Properties

| Property | Advanced Emulsion | High Performance Solvent Acrylic | Low Cost Solvent Acrylic |
| --- | --- | --- | --- |
| Solids (%) | 58 | 31 | 39 |
| Room Temp Static Shear (0.5 × 0.5 inch/1,000 g - minutes) | >5,000 | >5,000 | 2,580 |
| SAFT Shear Failure Temp (° C.) | >200 | >200 | 109 |
| Delta Opacity (Water Immersion for 1 hour at 65° C.) | <2 | <2 | <2 |
| 15 min. Peel (Stainless Steel - lb./in.) | 2.8 | 3.1 | 3.2 |
| 24 hour Peel (Stainless Steel - lb./in.) | 3.5 | 4 | 3.5 |
| 24 Hour Peel (HDPE - lb./in.) | 0.4 | 0.2 (zip) | 0.35 |
| Tack (Stainless Steel - lb.) | 3 | 3.5 | 3.3 |

As indicated in Table 4, the adhesive according to the present subject matter contained a significantly higher solids content, superior 24 hour peel to HDPE, and comparable static shear, SAFT, opacity after water immersion (tested using the above described hot water resistance test), and other peel and tack characteristics as the two known adhesives.

Tackified adhesives were synthesized with target glass transition temperatures (Tg) of −20° C. using predominantly 2-ethylhexyl acrylate and methyl acrylate monomers and Regalite R1090, an hydrocarbon resin tackifier with 90 deg C. softening point. Regalite R1090 was included at a level of 8.1% based on total monomer phase components (including tackifier). Approximately 2.9% by weight of methacrylic acid was included in each polymerization. RAFT mediated polymerizations were conducted via mini-emulsion polymerization using a pre-made RAFT oligomer dissolved in the monomer phase together with a small amount of heptadecyl acrylate as a hydrophobe.

The RAFT oligomer was prepared in a solvent system. The formulation was as provided in Table 5 as follows.

TABLE 5

Representative Formulation for Forming RAFT Oligomer

| | % Total |
| --- | --- |
| Reactor Charge | |
| Ethyl Acetate | 15.62 |
| Methacrylic acid | 21.44 |
| Butyl Acrylate | 50.24 |
| DBTTC 100% | 3.63 |
| Methanol | 4.50 |
| Initiator | |
| Vazo-64 | 0.22 |
| Ethyl Acetate | 4.36 |
| Reactor Charge Total | 100.00 |

The recipe stoichiometry set forth in Table 5 was designed to deliver a 5,000 g/mol polymer with 4 AAEM (acetoacetoxyethyl methacrylate) molecules per polymer end. The reaction was carried out at 80° C. and when complete (i.e., conversion >98%), the solvent (ethyl acetate and methanol) was stripped from the polymer solution using rotary evaporation at 60 deg C. The Mn of the isolated polymer was measured and found to be approximately 5,000 g/mole with a PDI of approximately 1.5. These oligomers were then utilized to make the RAFT mediated, tackified emulsion polymers.

The RAFT mediated polymerizations yielded polymers having molecular weights of approximately 40,000 and 60,000 g/mol, with low polydispersity (PDI). Each polymer dispersion was neutralized to a pH within a range of 7.5 to 9.5 using ammonia solution before adding Jeffamine T403 (trifunctional amine) cross-linker at equivalent stoichiometric weight based on available AAEM.

Figure 8:
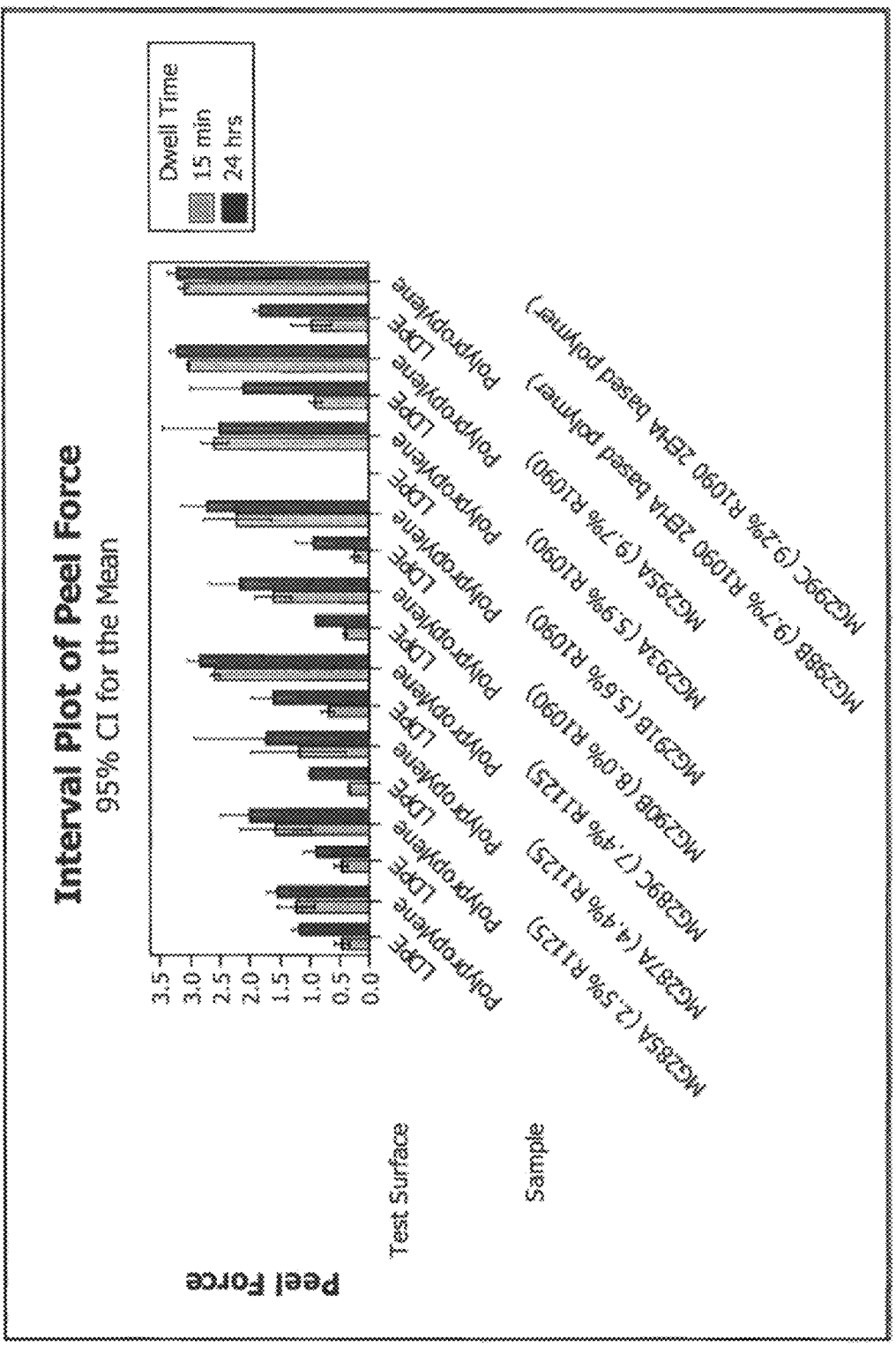
FIG. 8 is a graph comparing peel testing to both polypropylene and low density polyethylene surfaces for adhesives prepared in accordance with the present subject matter and where both level and softening point of hydrocarbon tackifier was varied.

FIG. 8 is a graph comparing peel testing to both polypropylene and low density polyethylene surfaces for adhesives prepared in accordance with the present subject matter and where both level and softening point of hydrocarbon tackifier was varied. The results show that low softening point resin (R1010) failed to improve peel to polypropylene and that the lower modulus provided by 2-EHA copolymer improves 15 minutes and 24 hr peel.

Figure 9:
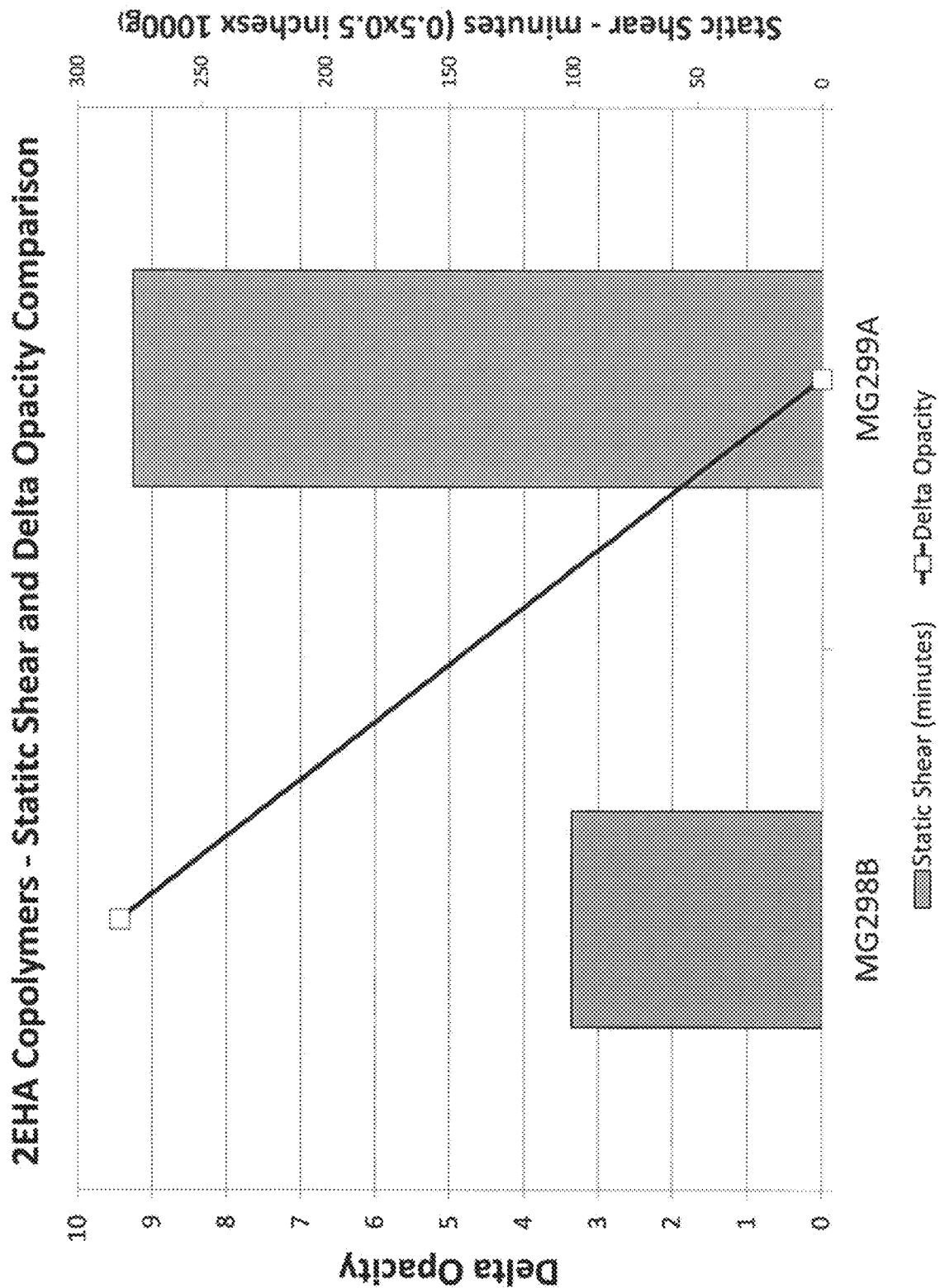
FIG. 9 is a graph comparing static shear and delta opacity testing for tackified, 2EHA based polymers with different molecular weights for adhesives prepared in accordance with the present subject matter.

FIG. 9 is a graph comparing static shear and delta opacity testing for tackified, 2EHA based polymers with different molecular weights for adhesives prepared in accordance with the present subject matter. The copolymers shown in FIG. 9 differ only in Mn via RAFT concentration and cross-linker addition. The copolymers include 2EHA, MAA, and MA. It was observed that the lower Mn provides tighter network and faster relaxation via lower entanglement number leading to higher peel to low surface energy (LSE) materials, high static shear, and low percent delta opacity. That is, the adhesive appears to have a good balance of rheology for improved LSE adhesion and static shear whilst sufficiently cross-linked to provide excellent water resistance (and/or aided by inter-particle mixing of polymer chains prior to crosslinking).

Polymer latex films were prepared by drawing down the latexes containing crosslinker directly to 2 mil polyethylene terephthalate (PET) film. The wet adhesive films were dried and cured in a convection oven at 120° C. for 5 minutes before laminating to silicone coated glassine release paper.

Adhesive coat weight of prepared laminates was measured by weighing a 100 mm×100 mm section of adhesive coated PET. The weight of a 100 mm×100 mm uncoated sample of PET was subtracted and the result multiplied by 100 to obtain a coat weight estimate in g/m$^2$.

180° peel adhesion after 15 minutes and 24 hours dwell to low density polyethylene test panels was measured by applying a 1 inch wide strip of test laminate to a stainless steel panel with a 5 pound roller with 1 pass in each direction. Samples were conditioned and tested at 23° C. After 15 minutes and 24 hours dwell, the average peel force was measured over at least 20 mm of tests strip three times.

Static shear was measured by adhering a ½ inch by ½ inch area of a looped test strip to a stainless steel panel and rolling with a 5 pound roller with one pass in each direction. After allowing the test strips to dwell overnight, a 1000 g test weight was hung via the loop formed in the test strip and the time to failure recorded.

Dynamic Mechanical Analysis (DMA) was performed on a TA Instrument AR-2000 rheometer using parallel plate clamps. 1.0 mm thick samples were placed in the clamp and annealed at 50° C. for 10 minutes to ensure good adhesion. The samples were then cooled to −50° C. for 10 minutes and ramped at 3° C. per minute up to 180° C. During the temperature ramp the sample was oscillated at a frequency of 10 rad/s.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or compositions. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An emulsion-based method of forming acrylate polymers, the method comprising:
   preparing a monomer phase including (i) one or more acrylate monomers, (ii) a controlled architecture acrylate oligomer, and (iii) one or more acrylate co-stabilizers;
   emulsifying the monomer phase using one or more copolymerizable surfactants to form a mini-emulsion;
   preparing a seed latex from the mini-emulsion.

2. The method of claim 1 further comprising:
   preparing a controlled architecture acrylate oligomer; and
   isolating the controlled architecture acrylate oligomer.

3. The method of claim 2 wherein the controlled architecture acrylate oligomer is prepared by solvent polymerization.

4. The method of claim 2 wherein the controlled architecture acrylate oligomer is prepared by combining (i) one or more acrylate monomers, (ii) one or more agents for controlled free radical polymerization, and optionally (iii) one or more comonomers.

5. The method of claim 4 wherein the agent for controlled free radical polymerization includes dibenzyl trithiocarbonate (DBTTC).

6. The method of claim 1 further comprising:
   growing the seed latex using emulsion polymerization to thereby form acrylate polymers.

7. The method of claim 1 wherein the preparation of the monomer phase includes one or more tackifiers.

8. The method of claim 7 wherein the tackifier is selected from the group consisting of a hydrocarbon resin, hydrogenated hydrocarbon resin, a fully hydrogenated hydrocarbon resin, a hydrogenated rosin ester, a fully hydrogenated rosin ester, and combinations thereof.

9. The method of claim 1 wherein the controlled architecture acrylate oligomer has a number average molecular weight (Mn) in a range of from about 500 to about 50,000 g/mol.

10. The method of claim 9 wherein the controlled architecture acrylate oligomer has a number average molecular weight (Mn) in a range of from about 1,000 to about 25,000 g/mol.

11. The method of claim 10 wherein the controlled architecture acrylate oligomer has a number average molecular weight (Mn) in a range of from about 2,500 to about 10,000 g/mol.

12. The method of claim 2 wherein isolating the controlled architecture acrylate oligomer is performed by evaporating solvent.

13. The method of claim 1 wherein acrylate monomers used in the preparing the monomer phase, are selected from the group consisting of acrylates, methacrylates, and combinations thereof.

14. The method of claim 1 wherein the acrylate co-stabilizer is a C6 to C20 acrylate co-stabilizer.

15. The method of claim 14 wherein the acrylate co-stabilizer is heptadecyl acrylate.

16. The method of claim 1 wherein the copolymerizable surfactant used in emulsifying the monomer phase is selected from the group consisting of allyl or vinyl substituted alkyl phenolethoxylates and their sulfates; block copolymers of polyethylene oxide, propylene oxide or butylene oxide with polymerizable end groups; allyl or vinyl substituted ethoxylated alcohols and their sulfates; maleate half esters of fatty alcohols; monoethanolamide ethoxylates of unsaturated fatty acids capable of undergoing autoxidative polymerization; allyl or vinyl polyalkylene glycol ethers; alkyl polyalkylene glycolether sulfates; functionalized monomer and surfactants; and combinations thereof.

17. The method of claim 1 wherein the mini-emulsion includes particles having a size within a range of from 2,000 to 10 nm.

18. The method of claim 17 wherein the particles have a size within a range of from 500 to 10 nm.

19. The method of claim 18 wherein the particles have a size within a range of from 300 to 10 nm.

20. The method of claim 1 wherein preparing the seed latex is performed by thermal initiation of the mini-emulsion.

21. Acrylate polymers formed by the method of claim 1.

22. The acrylate polymers of claim 21 wherein the polymers have a number average molecular weight (Mn) within a range of from 500,000 to 100,000 g/mol.

23. The acrylate polymers of claim 22 wherein the polymers have a number average molecular weight (Mn) within a range of from 250,000 to 110,000 g/mol.

24. The acrylate polymers of claim 2 wherein the polymers have number average molecular weight (Mn) within a range of form 200,000 to 125,000 g/mol.

25. The acrylate polymers of claim 24 wherein the polymers have a number average molecular weight (Mn) within a range of from 170,000 to 130,000 g/mol.

26. The acrylate polymers of claim 21 wherein the polymers have a polydispersity of less than 4.0.

27. The acrylate polymers of claim 26 wherein the polymers have a polydispersity of less than 3.0.

28. The acrylate polymers of claim 27 wherein the polymers have a polydispersity of less than 2.5.

29. The acrylate polymers of claim 28 wherein the polymers have a polydispersity of less than 2.0.

* * * * *